United States Patent
Freitag et al.

(10) Patent No.: US 6,595,579 B2
(45) Date of Patent: Jul. 22, 2003

(54) SUPPORTING PILLAR FOR A BODY FRAME OF A MOTOR VEHICLE

(75) Inventors: Elmar Freitag, Weil der Stadt (DE); Mario Glashagel, Friolzheim (DE); Bernhard Holzapfel, Remshalden (DE); Hubertus Steffens, Drolshagen (DE); Alois Voss, Bergneustradt (DE)

(73) Assignees: DaimlerChrysler AG, Stuttgart (DE); ISE Innomotive Systems Europe GmbH, Bergneustadt (DE)

( * ) Notice: Subject to any disclaimer, the term of this patent is extended or adjusted under 35 U.S.C. 154(b) by 0 days.

(21) Appl. No.: 10/117,520

(22) Filed: Apr. 4, 2002

(65) Prior Publication Data

US 2002/0167197 A1 Nov. 14, 2002

(30) Foreign Application Priority Data

Apr. 5, 2001 (DE) .......................... 101 17 009

(51) Int. Cl.⁷ .............................................. B60R 27/00
(52) U.S. Cl. ................... 296/193; 296/203.03; 296/205
(58) Field of Search ................. 296/187, 188, 296/189, 193, 203.01, 203.03, 205

(56) References Cited

U.S. PATENT DOCUMENTS

| | | | | |
|---|---|---|---|---|
| 3,776,589 A | * | 12/1973 | Barenyi et al. | 296/187 |
| 5,398,989 A | * | 3/1995 | Winter et al. | 296/203.03 |
| 6,217,109 B1 | * | 4/2001 | Okana et al. | 296/203.03 |
| 6,267,436 B1 | * | 7/2001 | Takahara | 296/188 |
| 6,322,135 B1 | * | 11/2001 | Okana et al. | 296/203.03 |
| 6,328,376 B2 | * | 12/2001 | Son | 296/203.03 |
| 6,332,643 B1 | * | 12/2001 | Sukegawa et al. | 296/203.03 |
| 6,386,625 B1 | * | 5/2002 | Dukat et al. | 296/203.03 |
| 6,474,726 B1 | * | 11/2002 | Hanakawa et al. | 296/203.03 |
| 6,494,525 B1 | * | 12/2002 | Blank | 296/203.03 |
| 2001/0020794 A1 | * | 9/2001 | Ishikawa | 296/188 |

FOREIGN PATENT DOCUMENTS

| | | |
|---|---|---|
| DE | 40 16 730 | 11/1991 |
| DE | 196 03 098 | 7/1997 |
| JP | 2000177629 | 6/2000 |

* cited by examiner

*Primary Examiner*—D. Glenn Dayoan
*Assistant Examiner*—Lori L Coletta
(74) *Attorney, Agent, or Firm*—Collard & Roe, P.C.

(57) ABSTRACT

A supporting pillar for a body frame of a passenger motor vehicle comprises a pillar-shaped hollow body with at least one profile shell. In the hollow body, a tubular body is arranged which essentially extends longitudinally through the hollow body and is attached to it. A lower region of the tubular body is held in a bracket attached to the profile shell. The bracket comprises two walls spaced apart from each other longitudinally. Each wall comprises a receiving aperture into which the lower region of the tubular body has been inserted, with the tubular body being attached at the receiving aperture to this bracket. The tubular body rests against, and is attached to the profile shell along a straight line, and is inclined in relation to a vertical line perpendicular to the walls of the bracket. The tubular body has an elbow between its lower region, and the region resting against the profile shell along the line.

21 Claims, 3 Drawing Sheets

SUPPORTING PILLAR FOR A BODY FRAME OF A MOTOR VEHICLE

BACKGROUND

The invention relates to a supporting pillar for a body frame of a motor vehicle, in particular a passenger motor vehicle. The invention also relates to a method of construction or assembly for the supporting pillar.

A supporting pillar of this type is known from German Patent DE 40 16 730 C2. It has a pillar-shaped hollow body made of two profile shells which enclose a hollow space. A tubular body arranged in this hollow space extends longitudinally and is attached to the hollow body. In the known supporting pillar, the hollow body has an internal shell between two external profile shells. The contour of the internal shell is adapted to the shape of the tubular body. The tubular body is attached to the interior shell and the interior shell is used to attach the tubular body to the hollow shell.

The tubular body is usually made independently of the intermediate shell. Due to manufacturing differences which result in position differences, it is only possible to join these forms without any tension in exceptional cases. Since it is difficult to establish a connection under tension, the attachment can only be achieved at high cost.

Furthermore, assembly of the known supporting pillar is very expensive because the internal shell which is connected to the tubular body, has to be installed into the external shells.

If the supporting pillar is arranged near the seatback of a driver seat or front passenger seat (the so-called "B-pillar"), in modern passenger motor vehicles, there is required particularly good protection against lateral impact so that a side airbag located between the seatback and the supporting pillar may be properly deployed. The supporting pillar should be inclined as far as possible in relation to a vertical axis to create a flatter vehicle design.

SUMMARY

It is the object of the present invention to provide a design for a supporting pillar which can be joined or assembled free of tension. Furthermore, it is an object that the supporting pillar is to ensure increased lateral impact protection.

For attachment purposes, the tubular body is first inserted into receiving apertures of bracket walls where the tubular body can be adjusted in the axial direction until it rests against the profile shell. The subsequent attachments between the tubular body and the bracket, and between the tubular body and the profile shell can then be made without any tension. Thus the invention makes it possible to compensate for differences and simplifies the production of the supporting pillar.

The lower region of the tubular body is inserted into the receiving apertures of the walls. These walls are essentially aligned perpendicular to the longitudinal direction of the tube. During a lateral impact, these walls are essentially parallel to the forces acting upon the tubular body. As a result of this design, particularly large support forces can be transmitted via these walls. Moreover, since the two walls are spaced apart from each other, additional moments can be supported via the bracket. During lateral impact, these moments act upon the tubular body, trying to turn this body around a longitudinal axis of the vehicle. This results in a particularly good dimensional stability during lateral impact. Accordingly, when the supporting pillar is used as a B-pillar, it can provide adequate spacing between the B pillar and the seatback for a sufficiently long time to ensure deployment of a side air bag.

In regard to quality assurance, the support pillar has additional advantages because straight-line contours are particularly easy to check, for example by applying a straight edge. It is just as easy to check predetermined inclinations of straight-line contours by using angle measuring devices.

In a preferred embodiment, the diameter of at least one of the receiving apertures in the walls of the bracket is larger than the external diameter of the tubular body inserted therein. A connecting disc is placed onto the tubular body, having an internal diameter corresponding to the external diameter of the tubular body, and an external diameter exceeding the diameter of the receiving aperture. The connecting disc is attached to the tubular body and to the bracket. This design makes it possible to compensate for differences in the area of the respective receiving aperture, since the tubular body is attached to the bracket indirectly via the respective connecting disc. This design also makes it possible to compensate for dimensional differences which occur during the manufacture of the elbow in the tubular body.

The bracket is preferably a folded body which rests against, and is attached to the profile shell. These characteristics make for easy production of the bracket and enable the transmission of relatively large forces when the vehicle is struck laterally.

In an advantageous embodiment, the bracket is arranged in the region of a door hinge and is connected to a fitting element of the door hinge. This connection to the fitting element increases the stability of the bracket, improving the load transmission between the tubular body and the body frame in the event of a crash. At the same time, it also increases the stability of the door hinge.

In another advantageous embodiment, in an upper region associated with the vehicle roof, the tubular body can rest against one of the profile shells along a first straight line and can be attached to the profile shell. In a middle region situated between the upper region and the lower region, the tubular body rests against one of the profile shells along a second straight line and is attached to this profile shell. The first line extends so that it is inclined in relation to the second line and the tubular body between its upper region and its middle region has a second elbow. As a result of this measure, the supporting pillar can have a particularly large inclination in relation to a vertical axis and yet comprises the desired stability characteristics.

In a particular improvement of this embodiment, the tubular body can comprise two tubes. With this design, one of the two tubes is inserted into the other and are attached, with each of the tubes having a elbow on a middle region. This design makes it possible to compensate for position differences which have to be considered when making the two elbows and in the production of the respective profile shell, by displacing the two tubes in relation to each other accordingly. Thus, this design ensures a tension free joining of the pillar to the motor vehicle body.

To provide particularly good stability values for the supporting pillar, tubes made of a high-strength material and having a constant cross-section are used for producing the tubular body. High-strength tubes of this type are relatively simple to produce, thus making the supporting pillar according to the invention relatively cost-effective.

Advantageously, the tubular body rests along one of the lines at points against the profile shell. The tubular body thus rests in a punctiform way against this profile shell. This measure facilitates automatic production, in particular with welding equipment or welding robots.

The bracket may comprise two walls which are spaced apart from each other and which extend essentially parallel in relation to each other. Each of these walls have a receiving aperture in which this tubular body is inserted. The tubular body is attached to the bracket at the receiving apertures.

The present invention also includes a method for the construction of a supporting pillar. A tubular body is manufactured having at least one elbow and a profile shell is produced with a bracket attached inside.

The tubular body is inserted into the profile shell. The lower region of the tubular body enters the receiving apertures shaped in the walls of the bracket. These receiving apertures are spaced apart from each other in a longitudinal direction of the tube.

The tubular body is aligned until it rests against the profile shell and along a straight line between the lower region and an upper end. The lower region of the tubular body is positioned in the receiving apertures so that the tubular body can be attached to the bracket walls directly or indirectly. The straight line is inclined to a vertical line which essentially extends perpendicular to the walls of the bracket.

The tubular body is attached to the bracket and to the profile shell.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION

Figure 1:
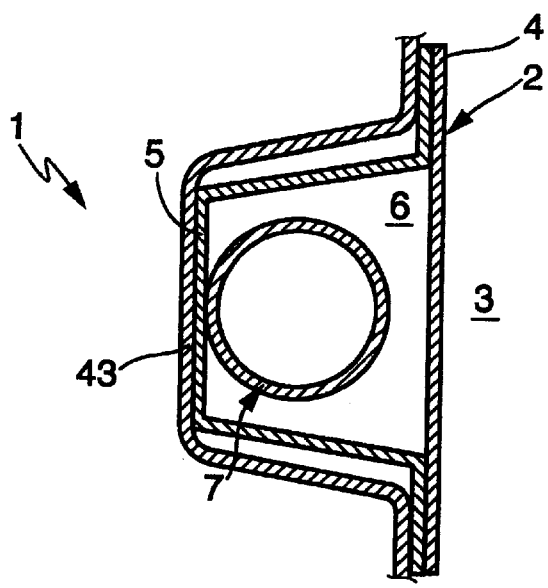
FIG. 1 shows a cross-sectional view of a supporting pillar according to the invention.

Referring now in detail to the drawings, FIG. 1, shows a supporting pillar 1 of a body frame (not shown) of a passenger motor vehicle. Supporting pillar 1 comprises a pillar-shaped hollow body 2 comprising two profile shells, namely an internal shell 4 facing a vehicle interior 3 and an external shell 5 facing away from vehicle interior 3. External shell 5 is U-shaped or C-shaped, while internal shell 4 acts as a cover. In principle, the invention does not need internal shell 4 so that the hollow body 2 can also comprise an open profile. Profile shells 4 and 5 encompass a hollow space 6 in which a tubular body 7 is arranged. Tubular body 7 essentially extends in a longitudinal direction of hollow body 2 and is attached to it or to external shell 5. In this embodiment, supporting pillar 1 has been inserted into outer panel 43 of a vehicle body (not shown).

Figure 2:
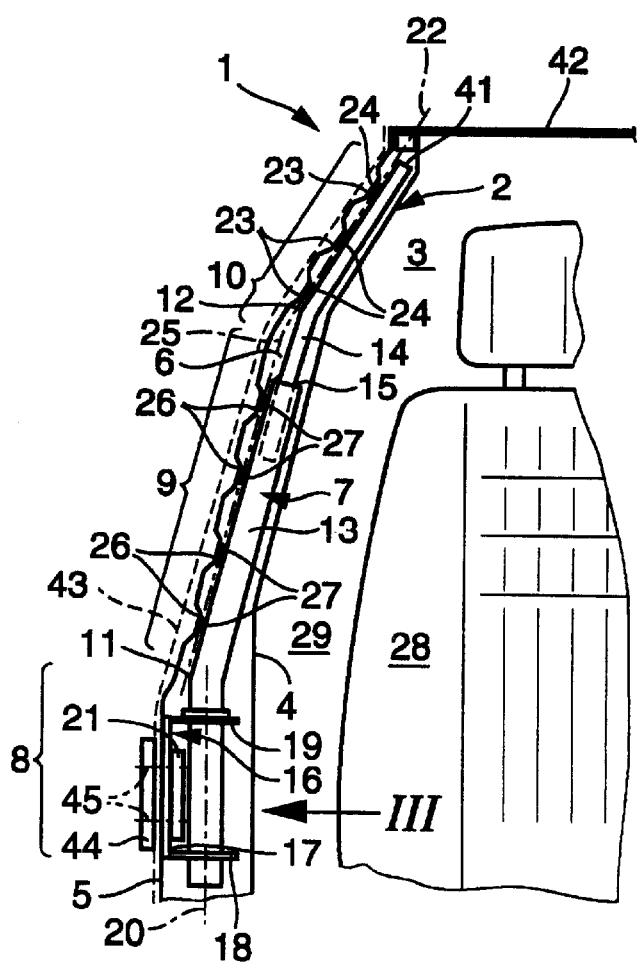
FIG. 2 shows a lateral partial sectional view of a region of a supporting pillar according to the invention.

FIG. 2 shows a second embodiment of the invention, wherein, tubular body 7 can be divided into three regions, namely a lower region 8, a middle region 9 and an upper region 10. Individual regions 8 to 10 are shown by curly brackets "{". At the point of transition between adjacent regions 8 to 10, tubular body 7 has an elbow, namely a first elbow 11 between lower region 8 and middle region 9 and second elbow 12 between middle region 9 and upper region 10. An end 41 of tubular body 7 faces away from lower region 8 of tubular body 7, and ends in the region of a vehicle roof 42. At this position, tubular body 7 is formed by two tubes 13 and 14, which in middle region 9, are inserted one into the other and attached to each other via weld connections 15. Accordingly, first elbow 11 was made on first tube 13 while second elbow 12 was made on second tube 14.

In lower region 8, tubular body 7 is attached to a bracket 16 which in turn is attached to external shell 5. Bracket 16 comprises a base plate 17 from which a lower wall 18 and an upper wall 19 lead out. Walls 18 and 19 are spaced apart from each other, essentially extending transversely to longitudinal direction 20 of lower region 8 of first tube 13. First tube 13 penetrates walls 18, 19 and is attached.

On the inside of base plate 17, bracket 16 comprises a fitting element 21 which is a threaded plate comprising several thread apertures. A component 44 of a door hinge (not shown) can be attached to fitting element 21, via screw connections 45. Fitting element 21 reinforces base plate 17. External shell 5 and outer panel 43 shown by a dashed line, should have holes or recesses in the region of fitting element 21 or hinge component 44, to connect fitting element 21 to hinge component 44. Attaching hinge component 44 to bracket 16 not only results in extreme rigidity of bracket 16 but also results in stable anchoring of the door hinge. During lateral impact on the side door, the forces are thus transferred via hinge component 44 directly to this highly rigid bracket 16 into supporting pillar 1, wherein even at a relatively shallow penetration depth, the penetration resistance increases greatly.

In upper region 10, second tube 14 rests against external shell 5 along a first straight line 22. In upper region 10 external shell 5 has several contact zones 23 in which external shell 5 comes to rest against second tube 14. At contact zones 23, second tube 14 is attached to external shell 5, via weld points 24.

In middle section 9, first tube 13 rests against external shell 5 along a second straight line 25. Here again, external shell 5 comprises contact zones 26 in which external shell 5 touches first tube 13 essentially at points. Here too, punctiform weld connections 27 are provided within contact zones 26, with first tube 13 being attached to external shell 5 via of weld connections 27. Both first line 22 and second line 25 extend so as to be inclined in relation to a straight line which is essentially perpendicular to walls 18, and 19 of bracket 16. This straight line coincides with the longitudinal direction 20 of the tubular body 7 in lower region 8. Furthermore, lines 22 and 25 also extend so as to be inclined in relation to each other. As a result of the creation of a spatial shape supporting pillar 1 is positioned at a pronounced angle in relation to the vertical axis. Consequently, the respective vehicle can be of a relatively flat design.

As explained above, supporting pillar 1 according to the invention has good dimensional stability and is suitable for use as a B-pillar as shown in FIG. 2. In vehicle interior 3, a space 29 is provided between supporting pillar 1 and a backrest 28 of a vehicle seat. During a crash, a side air bag can be deployed in space 29. In addition, during a crash, the rigidity of supporting pillar 1 ensures that intermediate space 29 is maintained for a sufficient time making room for a side-impact air bag, thus making a decisive contribution to vehicle safety. The excellent stability of supporting pillar 1 also improves the safety should the vehicle flip over or roll over. Furthermore, a B-pillar formed by supporting pillar 1 can take the load off an A-pillar of the frame so that this A-pillar can be designed to be slimmer and flatter.

Figure 3:
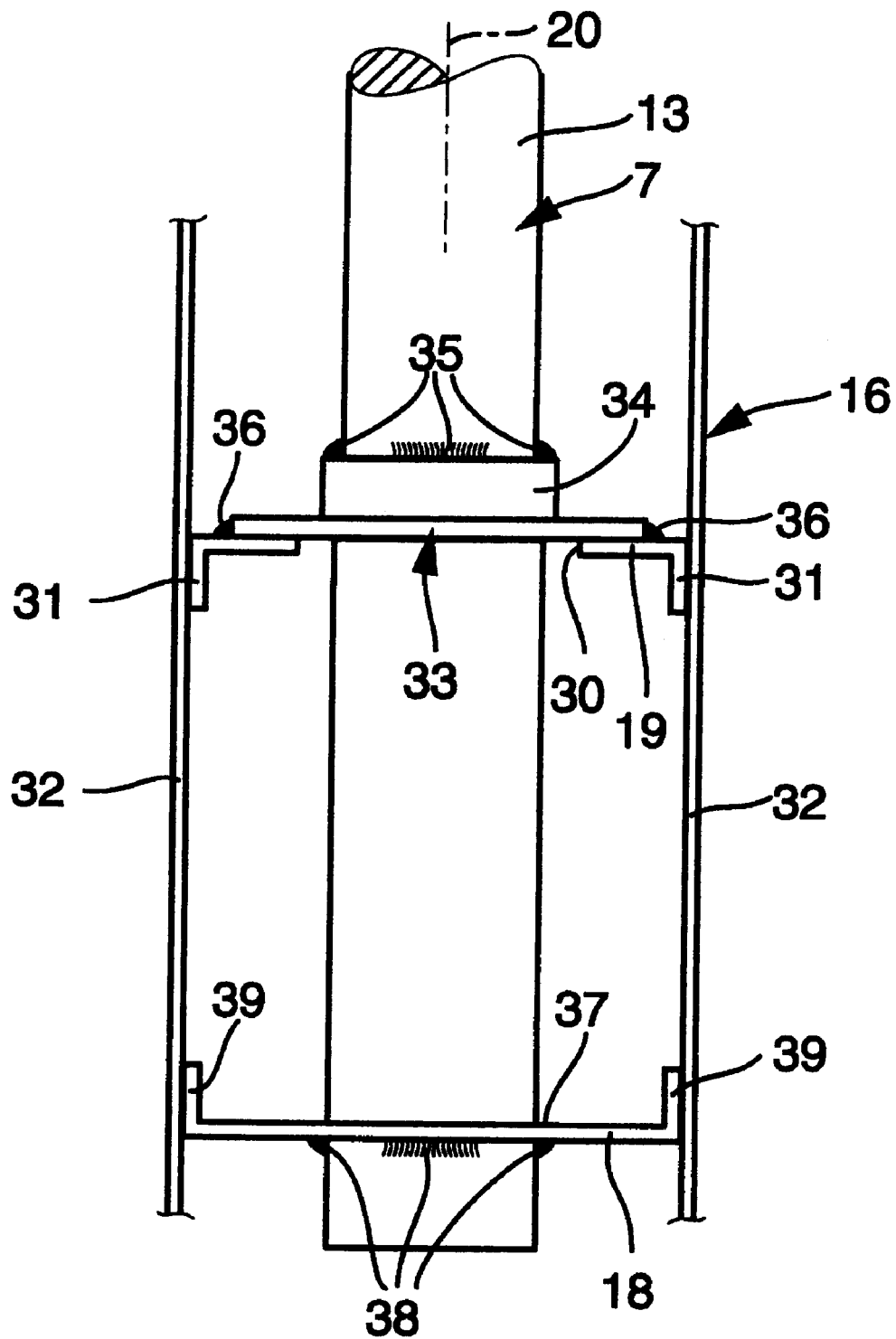
FIG. 3 shows a view, corresponding to arrow III of FIG. 2, of a section of the supporting pillar, with the internal shell not in place.

As shown in FIG. 3, upper wall 19 of bracket 16 comprises a U-shaped receiving aperture 30 whose open side in FIG. 3 faces the viewer. The aperture cross section of receiving aperture 30 is larger than the external cross-section of tubular body 7 inserted into it, or of lower first tube 13. In this way, tubular body 7 has some play in the plane of upper wall 19, making it possible to compensate for differences. By way of angled butt straps 31, upper wall 19 is attached to side cheeks 32 of bracket 16. Here again, point weld connections are preferred. A connecting disc 33 is placed onto lower region 8 of tubular body 7, and has a sleeve-like internal collar 34. The internal diameter of connecting disc 33 essentially corresponds to the external diameter of tubular body 7. Thus, connecting disc 33 can, at least during installation, be slid along tubular body 7, in a longitudinal direction 20 of tubular body 7, with relatively little play. The external cross-section of connecting disc 33 is selected to be large enough for connecting disc 33 to overlap receiving aperture 30 in radial direction. In the installed state, connecting disc 33 is attached to tubular body 7 by way of weld points 35. Furthermore, connecting disc 33 is firmly connected to upper wall 19 or to bracket 16 via weld points 36.

In principle, in the region of lower wall 18 the same attachment can be achieved between bracket 16 and tubular body 7 as has been achieved in the region of upper wall 19, by using a connecting disc 33. However, in the embodiment shown, which is the preferred embodiment, lower wall 18 comprises a closed receiving aperture 37 whose aperture cross-section essentially corresponds to the external cross-section of tubular body 7. Tubular body 7 is directly connected to lower wall 18 or bracket 16 via weld points 38, while tubular body 7 is connected to upper wall 19 only indirectly via connecting disk 33. Lower wall 18 is also supported via angled butt straps 39 at side cheeks 32 and fixed to side checks 32, preferably via weld points.

By means of angled butt straps 31, 39 which are attached to side walls 32, walls 18 and 19 are made substantially more rigid to elbowing in longitudinal direction 20 of the tube.

Figure 4:
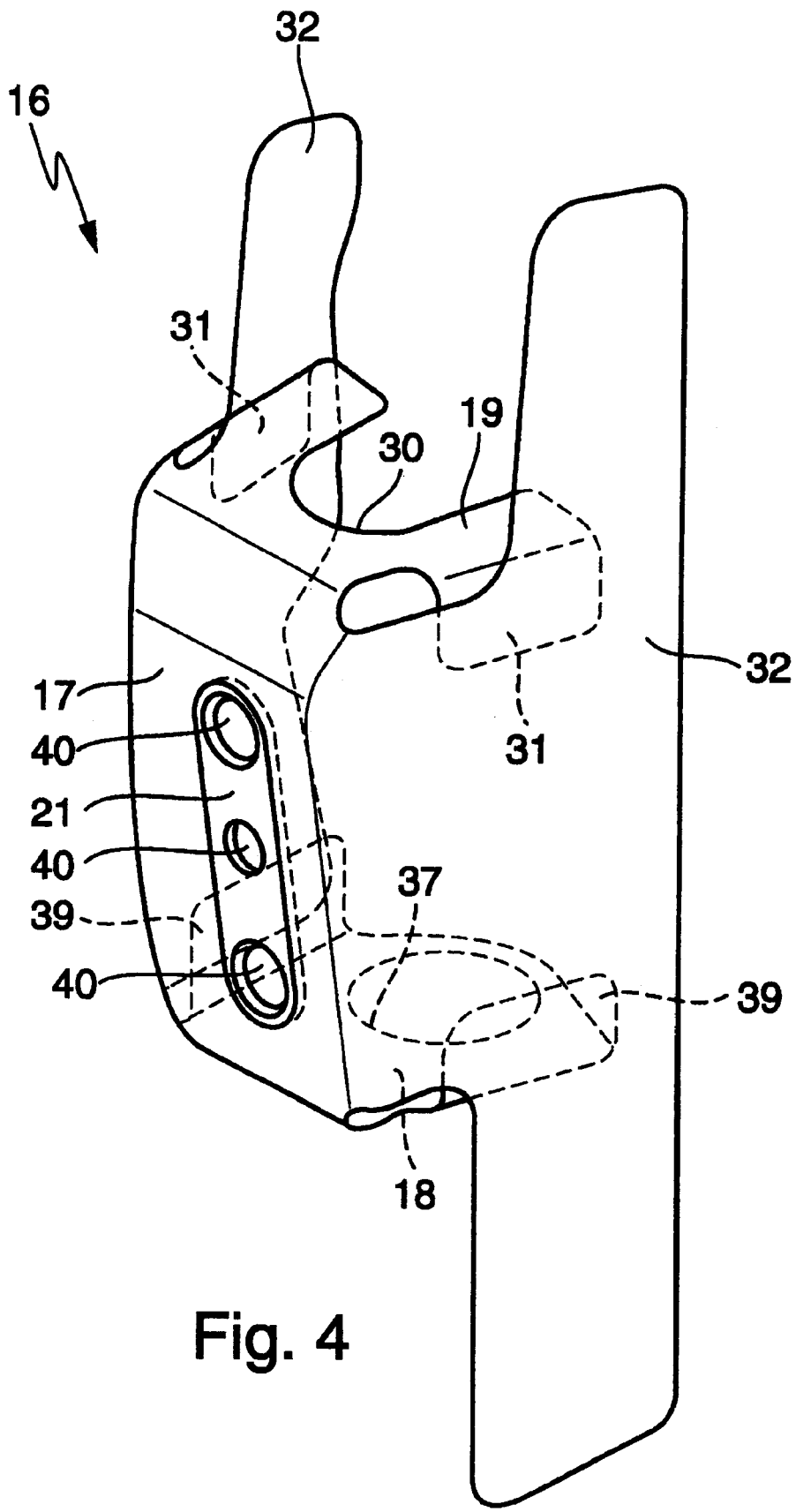
FIG. 4 shows a perspective view of a bracket of the supporting pillar.

As shown in FIG. 4, bracket 16 is preferably shaped as a folded body which can be made from a single piece of sheet metal via of respective deformation processes. Thus, side cheeks, 32, walls 18, and 19, their receiving apertures 30, and 37 and butt straps 31, and 39 are formed via suitable pressing and folding processes. At base plate 17, plate-shaped fitting element 21 comprises threaded apertures 40 for connecting the hinge.

Bracket 16 can be made to rest against external shell 5 over a large area via side cheeks 32. To compensate for dimensional differences, the sheet metal of bracket 16 can be re-formed relatively simply so that side cheek 32 hugs the contour of external shell 5 along a large area. In particular, side cheeks 32 can then be firmly connected to external shell 5 via weld points. In this way, bracket 16 can transmit relatively large forces between tubular body 7 and supporting pillar 1 and thus to the supporting framework.

The extensive load transmission and moment transmission in the region of bracket 16 is made possible wherein walls 18 and 19 extend essentially perpendicular to the longitudinal direction 20 of tubular body 7. As a result of this arrangement, walls 18 and 19 thus extend essentially parallel to the forces, which in the event of a crash, are transmitted from tubular body 7 to bracket 16. In this direction of load transmission, walls 18 and 19 are most stable, which results in a particularly high dimensional stability of supporting pillar 1 especially during a lateral crash. Walls 18 and 19 are spaced apart from each other in longitudinal direction 20 of the tube. In this way, they can absorb moments which are introduced into tubular body 7. It is clear that for the function of bracket 16 it does not matter whether tubular body 7 has one or several elbows 11, or 12. Bracket 16 can also be used with straight or curved tubular bodies 7.

Preferably, construction or assembly of supporting pillar 1 according to the invention is as follows:

First tube 13 is manufactured and given first elbow 11. In the same way, second tube 14 is manufactured and given second elbow 12. Subsequently tubes 13, 14 are pushed one into the other. The length of middle section 9 can then be set by relative displacements of tubes 13, and 14 one inside the other. Parallel to this, external shell 5 can be manufactured together with separately manufactured bracket 16.

In a subsequent step, tubular body 7, formed by tubes 13, 14 inserted into each other, is inserted into external shell 5, with lower region 8 of tubular body 7 entering receiving apertures 30 and 37 of bracket walls 18, 19.

After insertion, tubular body 7 is aligned until tubular body 7 in middle region 9 along second line 25 rests against external shell 5 or contact zones 26. During this process, first tube 13 is axially adjusted along second line 25 and/or, within receiving apertures 30, 37. First tube 13 is coaxially displaced in relation to the longitudinal direction of tube 20. Furthermore, second tube 14 is adjusted relative to first tube 13 until tubular body 7, in upper region 10, along first line 22, also contacts external shell 5 or contact zones 23. During this process, the space between second tube 14 and first line 22 is adjusted via axial displacement of second tube 14 in first tube 13. By contrast, the inclination of second tube 14 in upper region 10 can be adjusted by rotational adjustment of second tube 14 relative to first tube 13, so as to make second tube 14 rest against contact zones 23. In upper region 10, external shell 5 is dimensioned accordingly so that rotational adjustment of second tube 14 is possible.

After tubular body 7 has been adjusted in this way, it is attached, e.g. by welding, to bracket 16 and to external shell 5. Correspondingly, tubes 13 and 14 are also interconnected, and welded together. As an alternative, tubes 13 and 14 can also be aligned and fixed using a separate adjustment device which exactly simulates external shell 5 in all the points or areas essential for proper alignment. Thus, tubes 13 and 14 can be positioned relative to each other and attached to each other outside external shell 5, before being inserted as a unit into external shell 5. This approach realizes that during manufacture of external shell 5 and during manufacture of individual tubes 13, 14, in the course of series production, differences become more or less constant within related batches. Thus, adjusted adjustment device makes reliable alignment of tubes 13, 14 possible separate from external shell 5. As a result, the cycle time during series production of supporting pillar 1 can be increased. Furthermore, within the adjustment device, the weld connections for fixing together tubes 13 and 14 can be made so that no tension results within tubular body 7.

The adjustment device should be designed so that it can be adjusted to simulate a new batch or a new tolerance situation.

Connecting disc 33 is placed onto lower region 8 of tubular body 7, during the insertion of tubular body 7 into external shell 5, so that it can be adjusted along lower tubular region 8 for alignment in longitudinal direction 20 of the tube. To fix the resulting aligned position of tubular body 7, connecting disc 33 is attached to tubular body 7 and wall 19.

The placement of weld connections 24 and 27 in the region of contact zones 23 and 26 is at an external side of external shell 5. This external side faces away from tubular body 7 by attaching the weld points in that location. Since external shell 5 comprises a comparatively thin sheet of metal, the weld connection penetrates external shell 5, so that at the interior facing tubular body 7, it generates the desired weld connection between tubular body 7 and external shell 5. It is advantageous if during electric spot-welding a first welding electrode is placed at the exterior of external shell 5 while a second welding electrode is placed at the exterior of tubular body 7. Subsequently, by applying power, a weld point is generated in the contact zone between external shell 5 and tubular body 7, without the use of welding filler. After tubular body 7 has been attached to external shell 5, external shell 5 can then be closed off by placement and attachment of internal shell 4.

Preferably, the completely assembled or installed supporting pillar 1 forms a uniform installation component which in the context of final installation is inserted into outer panel 43 of the vehicle body as a pre-assembled unit.

Each of tubes 13 and 14 has a constant cross-section, but the diameter of second tube 14 is smaller than the diameter of first tube 13. As a result of this design, supporting pillar 1 can be of a slimmer design overall, in its upper region 10.

Accordingly, while at least one embodiment of the present invention has been shown and described, it is obvious that many changes and modifications may be made thereunto without departing from the spirit and scope of the invention.

What is claimed is:

1. A supporting pillar for a body frame of a passenger motor vehicle comprising:
    a) a pillar-shaped hollow body (2) comprising at least one profile shell (4, 5);
    b) a tubular body (7) extending in a longitudinal direction through said pillar-shaped hollow body (2), wherein said tubular body (7) has a lower region (8), a middle region (9), an upper region (10) and an end (41), and wherein said tubular body (7) rests against, and is attached to said at least one profile shell (4,5) between said lower region (8) and said end (41); and
    c) a bracket (16) attached to said at least one profile shell (4,5), wherein said bracket (16) has an upper wall (19) and a lower wall (18) spaced apart longitudinally, and wherein said upper wall (18) and said lower wall (19) each has a receiving aperture (30,37) into which said lower region (8) of said tubular body (7) is inserted, and where said tubular body (7) is attached to said bracket (16);
    wherein at least one of said regions of said tubular body (7) runs along at least one straight line that is inclined in relation to a vertical axis that is essentially perpendicular to said upper wall (18) and lower wall (19) of said bracket (16), and wherein said tubular body (7) has a first elbow (11) between said lower region (8) and said region that runs along said at least one straight line.

2. The supporting pillar according to claim 1, further comprising a connecting disc (33) disposed in said tubular body (7) wherein a cross section of at least one of said receiving apertures (30) of said lower wall exceeds an external cross-section of said tubular body (7), and wherein an internal cross-section of said connecting disc (33) approximately corresponds to the external cross-section of said tubular body (7), and an external cross-section of said connecting disc (33) exceeds a cross section of said receiving aperture (30), and wherein said connecting disc (33) is attached to said tubular body (7) and to said bracket (16).

3. The supporting pillar according to claim 1, wherein said bracket (16) is a folded body which establishes contact with and is attached to said profile shell (5).

4. The supporting pillar according to claim 1, wherein said bracket (16) is arranged in a region of a door hinge and is connected to a component (44) of said door hinge.

5. The supporting pillar according to claim 1, wherein:
    a) said tubular body (7) rests against, and is attached to said profile shell (5) along a first straight line (22) in said upper region (10) of said tubular body;
    b) said tubular body (7) rests against, and is attached to said profile shell (5) along a second straight line (25) in said middle region (9) of said tubular body;
    c) said first line (22) is inclined in relation to said second line (25); and
    wherein said supporting pillar further comprises a second elbow (12) that is disposed between said upper region (10) and said middle region (9) of said tubular body (7).

6. The supporting pillar according to claim 5, wherein said tubular body (7) comprises two tubes (13, 14), one of said tubes being inserted into the other and attached to each other at said middle region (9) of said tubular body (7), with each tube (13, 14) having a elbow (11, 12).

7. The supporting pillar according to claim 1, wherein said tubular body (7) comprises at least one tube (13, 14) with a constant cross-section and made from a high-strength material.

8. The supporting pillar according to claim 1, wherein said tubular body (7) exclusively comprises straight sections each of which is delimited by a tube end and a elbow (11, 12), or by two elbows (11, 12).

9. The supporting pillar according to claim 1, wherein said hollow body (2) comprises two profile shells (4, 5); wherein said two profile shells comprise an internal shell (4) facing a vehicle's interior (3) and an external shell (5) facing away from a vehicle's interior (3), and wherein said external shell (5) has a U-shaped or C-shaped profile into which said tubular body (7) is inserted, while said internal shell (4) closes said tubular body (7) in a cover-like manner.

10. The supporting pillar according to claim 1, wherein said tubular body (7) rests along said at least one straight line (22, 25) against said profile shell (5) and is attached to said profile shell in a punctiform way.

11. The supporting pillar according to claim 1, wherein said supporting pillar (1) is a completely assembled installation component which can be inserted into an outer panel (43) of the vehicle body.

12. A method for construction of a supporting pillar (1) for a body frame of a motor vehicle, comprising the following steps:
    a) manufacturing a tubular body (7) having at least one elbow (11, 12) and producing a profile shell (5) with a bracket (16) attached therein;
    b) inserting said tubular body (7) into said profile shell (5), with a lower region (8) of said tubular body (7) entering a plurality of receiving apertures (30, 37) shaped in walls (18,19) of said bracket (16), said receiving apertures (30, 37) being spaced apart from each other in a longitudinal direction (20) of the tube;

c) aligning said tubular body (7) until said tubular body (7) rests against said profile shell (5) along at least one straight line (22, 25) between said lower region (8) and an upper end (41), and until said lower region (8) of said tubular body (7) is positioned in said receiving apertures (30, 37) so that said tubular body (7) can be attached to bracket walls (18, 19) directly or indirectly, wherein said at least one straight line (22, 25) is inclined to a second straight line (20) which essentially extends perpendicularly to the walls (18, 19); and d) attaching said tubular body (7) to said bracket (16) and to said profile shell (5).

13. The method according to claim 12, further comprising the steps of:

a) placing at least one connecting disc (33) onto said lower region (8) of said tubular body (7) before said tubular body (7) is inserted into said profile shell;

b) adjusting said connecting disc (33) along said tubular body (7) until said connecting disc (33) touches said wall (19) of the associated receiving aperture (30) when aligning said tubular body; and c) said connecting disc (33) is connected to said tubular body (7) and to said wall (19) when said tubular body is attached to said bracket and to said profile shell.

14. The method according to claim 12, wherein said step of manufacturing said tubular body (7) includes manufacturing a first tube (13) with a first elbow (11) and a second tube (14) with a second elbow (12) that is inserted one into the other, and wherein said middle region (9) of said tubular body (7) is formed between said first elbow (11) and said second elbow (12), and said tubular body is adjustable in length by via a relative movement of said two tubes (13, 14) one inside the other.

15. The method according to claim 14, wherein said step of aligning said tubular body is carried out so that an upper region (10) of said tubular body (7) along said first straight line (22) and said middle region (9) of said tubular body (7) along said second straight line (25) rest against said profile shell (5), with said first line (22) inclined in relation to said second line (25).

16. The method according to claim 15, wherein said step of aligning said tubular body and said two tubes (13, 14) relative to each other and attachment of said two tubes (13, 14) to each other is carried out in a separate adjustment device which simulates said profile shell (5).

17. The method according to claim 16, wherein simulation of the adjustment device is adjustable.

18. The method according claim 12, wherein said step of attaching said tubular body (7) to said profile shell (5) takes place through weld points, placed by means of an electric spot-welding process using two welding electrodes, wherein said weld points weld together said profile shell (5) at its inside contact to said tubular body (7), with one welding electrode being applied on the outside and the other welding electrode being applied on the inside of said tubular body (7).

19. The supporting pillar according to claim 1, wherein said upper wall (19) and said lower wall (18) on said bracket (16) are spaced apart from each other and extend essentially parallel in relation to each other, and wherein each of said walls (18, 19) has a receiving aperture (30, 37) in which said tubular body (7) is insertable, and wherein said tubular body (7) is attached to said bracket (16) at said receiving apertures (30, 37).

20. The supporting pillar according to claim 19, wherein said bracket (16) is a folded body.

21. The supporting pillar according to claim 19, wherein said bracket (16) comprises a fitting element (21) to which a component (44) of a door hinge is attachable.

* * * * *